United States Patent Office 3,522,264
Patented July 28, 1970

3,522,264
ANTHRAQUINONE DYESTUFFS
Christian Zickendraht, Binningen, and Arthur Buehler, Rheinfelden, Switzerland, assignors to Ciba Limited, Basel, Switzerland, a company of Switzerland
No Drawing. Continuation-in-part of application Ser. No. 521,421, Jan. 18, 1966. This application Dec. 17, 1968, Ser. No. 784,475
Claims priority, application Switzerland, Feb. 3, 1965, 1,492/65
Int. Cl. C07d 91/50
U.S. Cl. 260—303                                    3 Claims

ABSTRACT OF THE DISCLOSURE

New anthraquinone dyestuffs free from carboxyl and sulphonic acid groups and which contain at one or more α-positions of a monoanthraquinone nucleus a substituent of the formula (1)
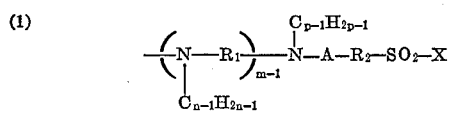

in which $n$ and $p$ each represents a positive integer not greater than 7, $m$ represents a positive integer not greater than 2, $R_1$ and $R_2$ each represents a benzene nucleus, A represents a —CO- or —$SO_2$-group and X represents the radical of an aliphatic amine containing at least 4 and not more than 10 carbon atoms and which is bound to the —$SO_2$-bridging group through its nitrogen atom, which can be used for spin-dyeing.

CROSS-REFERENCE TO RELATED APPLICATION

This is a continuation-in-part application of our co-pending application Ser. No. 521,421, filed Jan. 18, 1966, now abandoned.

The present invention provides new anthraquinone dyestuffs free from carboxyl groups and sulphonic acid groups and that contain in one or more α-positions of a monoanthraquinone nucleus a substituent of the formula (1)
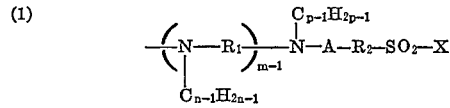

in which $n$ and $p$ each represents a positive integer not greater than 7, $m$ represents a positive integer not greater than 2, $R_1$ and $R_2$ each represents a benzene nucleus, A represents a —CO- or —$SO_2$-group and X represents the residue of an aliphatic amine containing at least 4 carbon atoms and not more than 10 carbon atoms and which is bound to the —$SO_2$-bridging group by its nitrogen atom.

These dyestuffs are obtainable when α-aminoanthraquinones are acylated with acid halides of the formula (2)                Halogen-A—$R_2$—$SO_2$—X in which $R_2$, A and X have the meanings ascribed to them in Formula 1 or when anthraquinone dyestuff sulphonic acid halides containing a substituent of the formula

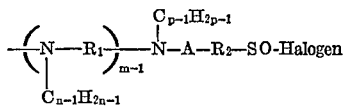

at one or more α-positions of a monoanthraquinone nucleus, in which Formula $n$, $m$, $p$, $R_1$, $R_2$ and A have the meanings ascribed to them in Formula 1 are amidated with aliphatic amines containing 4 to 10 carbon atoms.

The intermediate products of the Formula 2 in which A represents a —CO-bridge, to be used are obtainable by halogenation, for example, with thionyl chloride, of the corresponding carboxylic acids that are obtainable when benzoic acid sulpho-halides (for example, 4- and especially 3-carboxybenzene-1-sulphonic acid chloride or bromide, 3-carboxy-4-methyl- or 4-chlorobenzene-1-sulphonic acid chloride, 3-carboxy-6-methoxybenzene-1-sulphonic acid chloride or bromide) are amidated with amines of the kind defined.

Such amines may be cyclic (for example, cyclohexylamine), straight-chain or branched aliphatic amines, including unsubstituted alkylamines (for example, butylamines, octylamine, iso-octylamine, 2-ethylhexylamine) and advantageously alkoxy-alkylamines containing 2 or 3 carbon atoms in the alkyl portion and 2 to 8 or 7 in the alkoxy portion.

As examples of such amines the following may be particularly mentioned: β-ethoxyethylamine, γ-methoxypropylamine, γ-ethoxypropylamine, β-butoxyethylamine, γ-propoxy or γ-isopropoxypropylamine, hexoxyethylamine, hexoxypropylamine and the like.

The intermediate products of the Formula 2 in which A represents an —$SO_2$-bridge, to be used in the process may be obtained by halogenation (for example, with thionyl chloride or phosphorus halides) of the appropriate sulphonic acids, or by replacement of the amino group by a sulphohalide group in the corresponding aminobenzene-sulphamides. This can be effected by known methods by diazotization of the aminobenzenesulphamides (for example, 4- and especially 3-aminobenzene-1-sulphonic acid-N-,γ-isopropoxypropylamide,
3- or 4-aminobenzene-1-sulphonic acid-N-cyclohexylamide,
3- or 4-aminobenzene-1-sulphonic acid-N,α-ethylhexylamide,
3- or 4-aminobenzene-1-sulphonic acid-N-butyl or decyl amide,
3-amino-4-methyl- or 4-chloro-benzene-1-sulphonic acid-N,γ-ethoxypropylamide)

and reaction of the diazo compound with sulphur dioxide and hydrochloric acid in the presence of copper chloride.

The α-aminoanthraquinones to be acylated in accordance with the invention may contain other substituents in addition to acylatable amino groups, for example, halogen atoms and hydroxyl, alkoxy, aryloxy and acylamino groups and the like, but they must not contain carboxy or sulphonic acid groups. Suitable aminoanthraquinones are not only 9:10 dioxoanthracenes, but also derivatives thereof that contain a condensed ring in 1:9-position, as well as thiophanthrenequinones. The following are examples of acylatable starting materials:

1-aminoanthraquinones,
1,4- and 1,5-diaminoanthraquinone,
1,4,5,8-tetraaminoanthraquinone,
1-amino-4- or -5-hydroxyanthraquinone,
1-amino-3-bromo-4-hydroxyanthraquinone,
1-amino-3-chloro-4-hydroxyanthraquinone,
1-(para- or meta-aminophenylamino)-4-hydroxyanthraquinone,
1-(para- or meta-aminophenylamino)-4-aminoanthraquinone,
1,β-aminoethylamino-4-hydroxyanthraquinone,
1-amino-4-bromo- or 4-anilinoanthraquinone,
1,5-diamino-4,8-dihydroxy-2-phenylanthraquinone,
1,5-diamino-4,8-dihydroxy-2-phenoxyanthraquinone,
1,5-diamono-4,8-dihydroxyanthraquinone,
1-amino-isothiazoleanthrone,
1,N-methylamino-4-(meta- or para-aminophenylamino)-anthraquinone, 1-(meta- or para-aminophenylamino)-anthraquinone,
1-amino-4- or 5-benzoylaminoanthraquinone,
1,4-diamino-2-methoxyanthraquinone, and
1,4-diamino-2-(β-hydroxyethyloxy)-anthraquinone.

Acylation of these aminoanthraquinone derivatives with acid halides of the Formula 2 in accordance with the invention may be carried out by known methods, for example, in the presence of an agent capable of binding acid at room temperature or by heating in an inert organic solvent, for example, chlorobenzene, nitrobenzene, toluene, dimethylformamide or mixtures thereof, if necessary, in the presence of an organic base (for example, pyridine, a trialkylamine and so forth).

The amidation in accordance with the invention of aliphatic amines containing 4 to 10 carbon atoms with sulphonic acid halides containing at one or more α-positions of a mono-anthraquinone nucleus a substituent of the formula

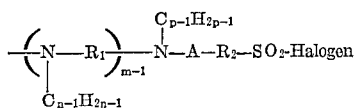

in which $n$, $m$, $p$, $R_1$, $R_2$ and $A$ have the meanings ascribed to them in Formula 1, may be effected by known methods, for example, at room temperature in the presence of an agent capable of binding acid or with the application of heat in an inert organic solvent, for example, chlorobenzene, nitrobenzene, toluene or dimethylformamide or in mixtures thereof, if necessary in the presence of an excess of the amine used.

Amines of the kind defined may be cyclic (for example, cyclohexylamine), straight-chain or branched aliphatic amines including unsubstituted alkylamines (for example, butylamine, octylamine, iso-octylamine, 2-ethyl-hexylamine or decylamine), and advantageously alkoxyalkylamines containing 2 or 3 carbon atoms in the alkyl portion and 2 to 8 or 7 in the alkoxy portion.

Examples of amines of the kind defined are primarily β - ethoxyethylamine, γ-methoxypropylamine, γ-ethoxypropylamine, β - butoxyethylamine, γ - propoxy- or γ-isopropylamine, hexoxyethyl- and hexoxypropylamine and the like.

The dyestuffs of the invention can also be prepared by condensing an α-halogenanthraquinone (for example, 1-amino-4-chloro- or 4-bromoanthraquinone, 1-methylamino - 4 - bromoanthraquinone, 1-amino-2,4-dibromoanthraquinone or 1-amino-4-bromoanthraquinone - 2 - sulphonic acid) with an amide of the formula

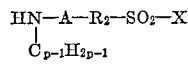

in which $p$, $R_2$, $A$ and $X$ have the meanings ascribed to them in Formula 1.

Suitable amines are, for example, benzene-1-sulphonic acid - N,γ - isopropoxypropylamine - 3- or 4-sulphonic acid amide, benzene - 1 - sulphonic acid-N-cyclohexylamide-3- or 4-sulphonic acid amide, benzene-1-sulphonic acid-N,α-ethylhexylamide-3- or 4 - sulphonic acid amide, 6 - methoxybenzene - 1 - sulphonic acid-N,γ-isopropoxypropylamide-3- or 4-sulphonic acid amide, and benzene-1-sulphonic acid-N-butylamide-4-sulphonic acid amide.

Condensation of amides of the kind defined with α-halogenanthaquinones is carried out in an aqueous or organic medium in the presence of an agent capable of binding acid, for example, sodium acetate or potassium acetate, if necessary, in the presence of copper salts, for example, copper chloride or copper acetate.

Further substituents can be introduced into the dyestuff molecule or protected groups can be liberated subsequent to condensation in accordance with the invention or subsequent to acylation or amidation in accordance with the invention.

For example, subsequent to acylation of aminoanthraquinone, it is possible to convert a sulphonamido group into an amino group by treatment with an alkali. In a modification of the process it is possible by reduction to split off a sulphonic acid group in 2-position in a 1-aminoanthraquinone containing a substituent of the Formula 1 in 4-position. In this modification of the process, which also produces the dyestuffs of the invention free from sulphonic groups and carboxy groups, reductive elimination of the sulphonic acid group in 2-position is carried out, for example, in a slightly acid to alkaline medium, preferably an aqueous medium, by means of a weak reducing agent, for example, sodium sulphide, glucose, cellulose xanthate, a hydroxyalkane sulphonic acid, zinc or sodium formaldehyde sulphoxylate, or by means of a stronger reducing agent, for example, sodium dithionite, thiourea dioxide and the like. Reduction is advantageously carried out at a moderately raised temperature, for example, at 20° to 60° C. After elimination of the sulphonic acid group in 2-position it is also possible if necessary to reoxidize the dyestuffs formed. Thus, it is also possible to produce the dyestuffs of the invention in those cases where treatment with the reducing agent has not only split off the sulphonic acid group in 2-position of the anthraquinone nucleus, but has also brought about reduction of the anthraquinone dyestuff.

It is possible not only to split off a sulphonic acid group present in 2-position of the anthraquinone nucleus as described in the preceding paragraph, but also to replace it by other substitutents. For example, an alkoxy group or a phenoxy group can be introduced in 2-position by reaction with alcohols or phenols. This is advantageously effected by heating a 1-aminoanthraquinone-2-sulphonic acid which contains a substituent of the Formula 1, for example, in 4-position at 100 to 150° C. with an alcohol or phenol, for example, glycol in the presence of an alkali solution.

The dyestuffs obtainable by the process of the present invention are new. They are soluble in organic solvents, for example, esters, and especially in alcohol and acetone. The dyestuffs are suitable for colouring natural and synthetic resins, waxes, lacquers and plastic materials, for example, cellulose ethers and esters; for example, they can be used in the spin-dyeing of cellulose acetate rayon and for colouring natural and synthetic polymers and condensation products. They are specially suitable for use in the preparation of inks for ball-point pens.

Cellulose acetate rayon, for example, can be coloured clear, fast tints with the dyestuffs of the invention when they are applied by the spin-dyeing process.

The following examples illustrate the invention. Unless otherwise stated, the parts and percentages are by weight.

EXAMPLE 1

16 parts of 1-amino-4-phenylaminoanthraquinone and 18 parts of benzene-sulphonic acid-N-(γ-isopropoxypropyl)-amide-3-carboxylic acid chloride are stirred for one hour under reflux in 300 parts of boiling nitrobenzene whereby a solution is formed. The solvent is removed by steam distillation and the residue is isolated and dried. The dyestuff so obtained is a dark blue powder soluble in acetone. It colours cellulose acetate spinning compositions fast, bluish violet tints.

The carboxylic acid chloride used for the acylation may be prepared in the following manner: benzoic acid is chlorosulphonated in known manner with chlorosulphonic acid, the sulphochloride is converted into the corresponding sulphamide with isopropyloxypropylamine and subsequently the benzene-sulphonic acid-isopropoxypropylamide-3-carboxylic acid is treated with thionyl chloride.

The acylation process described above is suitable for the acylation of the dyestuffs listed in Column I of the following table with the acylating agents listed in Column II; the tint produced by the acylated dyestuff in a cellulose acetate spinning composition is indicated in Column III.

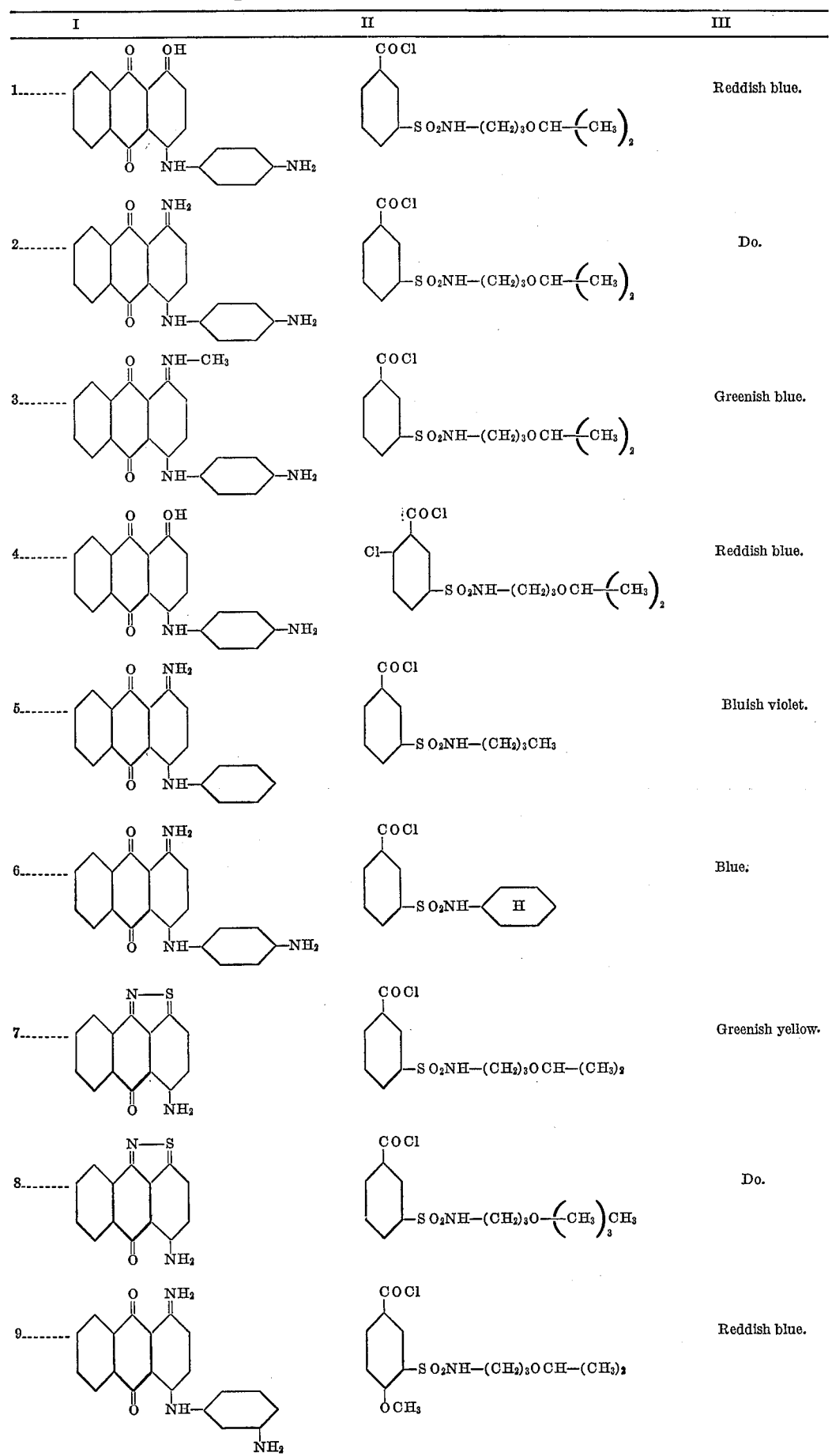

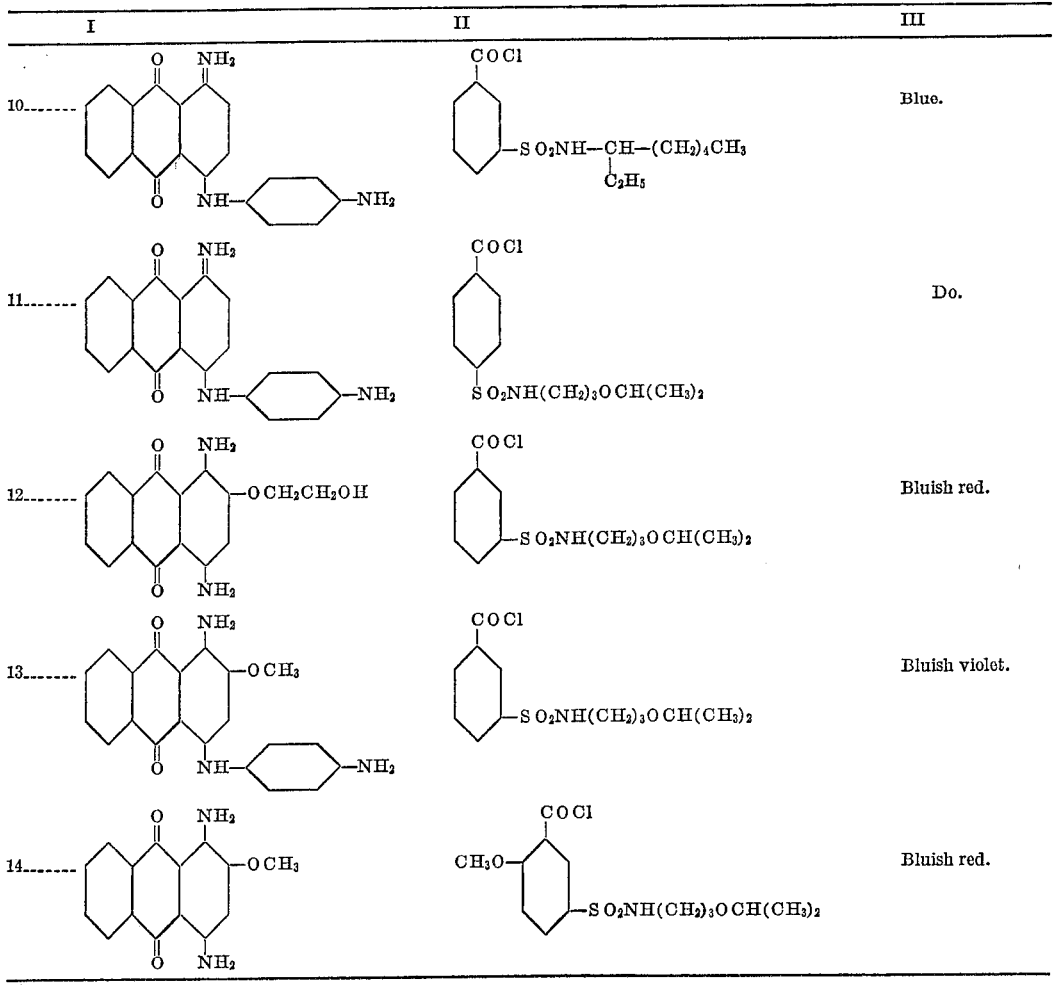

EXAMPLE 2

13.5 parts of 1,5-diamino-4,8-dihydroxyanthraquinone and 35 parts of benzene-sulphonic acid-N-(γ-isopropoxypropyl)-amide-3-carboxylic acid chloride are heated for 2 hours under reflux in 300 parts of nitrobenzene. The solvent is then removed with steam and the residue is isolated and dried. The dyestuff so obtained of the formula

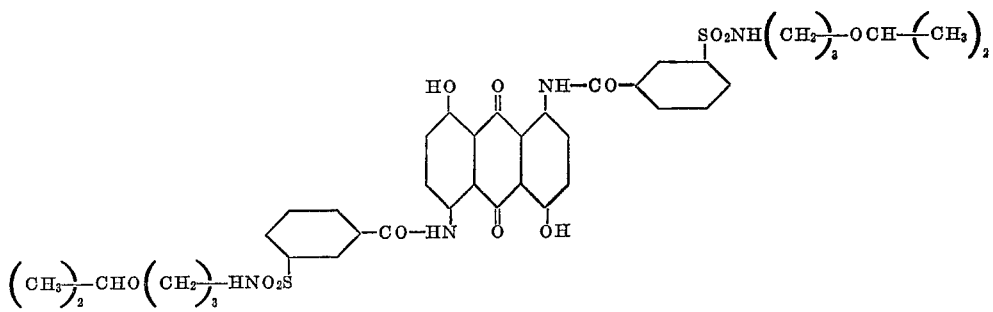

is a dark blue powder which forms a violet solution in acetone and which colours cellulose acetate spinning compositions fast violet tints.

EXAMPLE 3

41 parts of 1-amino-4-(3'-aminophenylamino)-anthraquinone-2-sulphonic acid are dissolved in 1,000 parts of water and 4 parts of sodium hydroxide. 35 parts of benzene-sulphonic acid-N-(γ-isopropoxypropyl)-amide-3-carboxylic acid chloride are added to the solution while stirring well and the pH value is kept at 6 to 7 by the addition of sodium hydroxide solution. Acylation is complete after a short period of time. The dyestuff is desulphonated in known manner by treating at 25° to 30° C. with 17 parts of sodium dithionite and the precipitated dyestuff is isolated and washed. After drying, it is a dark blue powder readily soluble in acetone. It colours cellulose acetate spinning compositions fast, reddish blue tints.

EXAMPLE 4

34 parts of 1-chloro-2-carboxybenzene-4-sulphonic acid-N-(γ-isopropoxypropyl)-amide are suspended in 300 parts of chlorobenzene and the suspension is dehydrated azeotropically by distilling off 100 parts of the solvent. 14 parts of thionyl chloride are added and the batch is stirred for three hours at 80° to 85° C. The excess thionyl chloride is then completely removed by introducing a stream of dry air. 27 parts of 1-hydroxy-4-(4'-aminophenylamino)-anthraquinone are then added to the solution and the whole is stirred for three hours under reflux. The product is worked up in the usual manner and dyestuff No. 4 of the above table is obtained.

EXAMPLE 5

21 parts of 1-amino-2-methoxy-4-(4'-methylphenylsulphamido)-anthraquinone and 20 parts of benzene sulphonic acid - N-(γ-isopropoxypropyl)-amide-3-carboxylic acid chloride are stirred for 2 hours at the boil and under reflux in 300 parts of chlorobenzene. When acylation is finished the solvent is removed by steam distillation and the residue is isolated and washed with water. The moist, yellowish brown product is boiled in a dilute sodium hydroxide solution until complete hydrolysis of the methylphenylsulphamide group has taken place. The dark red dyestuff so obtained colours cellulose acetate spinning compositions pure, bluish red tints.

EXAMPLE 6

41 parts of 1-amino-4-(3'-aminophenylamino)-anthraquinone-2-sulphonic acid are dissolved in 1,000 parts of water and 4 parts of sodium hydroxide. 42 parts of benzenesulphonic acid - N - (γ - isopropoxypropyl)-amide-3-sulphonic acid chloride (obtained by a diazotization of aminobenzene - 3 - sulphonic acid-N,γ-isopropoxypropylamide and reaction of the diazo compound with sulphur dioxide and hydrochloric acid in the presence of copper chloride) are added to the solution while stirring, the pH value being kept at 6 to 7 by the addition of sodium hydroxide solution. Acylation is finished after a short time. The dyestuff is desulphonated in known manner by treatment with sodium dithionite at 25 to 30° C., isolated and washed. When dry, it is a dark blue powder readily soluble in acetone which colours cellulose acetate spinning compositions fast, reddish blue tints.

EXAMPLE 7

12.7 parts of 1-methoxy-4-aminoanthraquinone are dissolved in 300 parts of pyridine and 22 parts of 1-chlorobenzene - 4-isopropoxypropylsulphamide-2-sulphochloride are added while stirring. Acylation is finished after stirring for one hour under reflux. The pyridine is distilled with steam, the batch is filtered, and the dyestuff obtained is washed with dilute sodium hydroxide solution and water. When dry, it is a dark yellow powder soluble in acetone and colours cellulose acetate spinning compositions fast, golden yellow tints.

Similar anthraquinone-sulphamides can be prepared in an analogous manner by acylating the aminoanthroquinones listed in Column I of the following table with the sulphochlorides indicated in Column II; the tint produced in a cellulose acetate spinning composition is given in Column III.

| I | II | III |
|---|---|---|
| 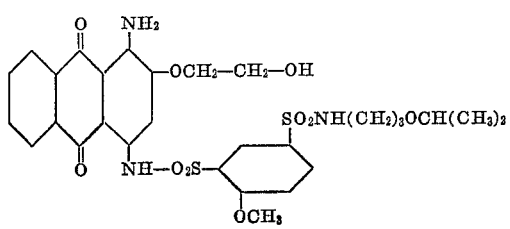 | 2ClO₂S—⟨⟩—SO₂NH(CH₂)₃OCH(CH₃)₂ | Greenish yellow. |
| (1,5-diamino-anthraquinone) | | |
| (1,5-dihydroxy-4,8-diamino-anthraquinone) | 2ClO₂S—⟨⟩—SO₂NH(CH₂)₃OCH(CH₃)₂ | Violet. |

EXAMPLE 8

19 parts of 1-amino-4-bromoanthraquinone-2-sulphonic acid, 22 parts of 1-methoxybenzene-2-sulphonic acid amide-4-sulphonic, acid - N - γ - isopropoxypropylamide (prepared by diazotizing 1-methoxy - 2 - aminobenzene-4-sulphonic acid-N-γ-isopropoxypropylamide, reacting the diazo compound with sulphur dioxide and hydrochloric acid in the presence of copper chloride and amidating with ammonia), 6 parts of sodium carbonate and 1 part of copper chloride are suspended in 800 parts of water, and the suspension is stirred for 15 minutes at 90 to 95° C. When cold, the solution is neutralized and 15 parts of magnesium sulphate are then added. The magnesium salt of the condensation product precipitates. It is isolated by filtration and dried. The magnesium salt is heated for 2 hours at 110 to 115° C. in a large excess of α,β-dihydroxyethane in the presence of potassium hydroxide, which process produces a glycolether of the formula (anthraquinone glycolether dyestuff structure with OCH₂—CH₂—OH, NH₂, and NH—O₂S—⟨⟩—SO₂NH(CH₂)₃OCH(CH₃)₂ with OCH₃ substituent)

This dyestuff is precipitated by diluting the reaction mixture with water, isolated by filtration and dried. It is readily soluble in acetone and colours cellulose acetate spinning compositions fast, bluish red tints.

EXAMPLE 9

16 parts of 1-methylamino-4-bromoanthraquinone, 25 parts of benzene-sulphonic acid-N-(γ-isopropoxypropyl)-amide-3-sulphonic acid amide, 8 parts of anhydrous potassium acetate and 2 parts of anhydrous copper acetate are suspended in 300 parts of amyl alcohol, and the whole is stirred for one hour under reflux. The solvent is removed by steam distillation and the condensation product is isolated by filtration. When dry, it is a violet powder readily soluble in acetone and colours cellulose acetate spinning compositions fast, reddish violet tints.

Similar dyestuffs can be prepared in an analogous manner from 1-methylamino-4-bromoanthraquinone and the disulphamides listed in Column I of the following table; the tint produced in a cellulose acetate spinning composition is indicated in Column II.

| I | II |
|---|---|
| NH₂—O₂S—⟨—Cl⟩—SO₂NHC₄H₉ | Violet. |
| O₂S—⟨—Cl⟩—SO₂NH—⟨H⟩ with NH₂ | Do. |
| H₂N—O₂S—⟨—Cl⟩—SO₂NH—⟨H⟩ | Reddish violet. |
| H₂N—O₂S—⟨—Cl⟩—SO₂NH—C₄H₉ | Do. |
| H₂N—O₂S—⟨—Cl⟩—SO₂NH(CH₂)₃OCH₃ | Do. |
| H₂N—O₂S—⟨—Cl⟩—SO₂NH(CH₂)₃OCH(CH₃)₂ | Do. |
| H₂N—O₂S—⟨⟩—Cl with SO₂NH(CH₂)₃OCH(CH₃)₂ | Violet. |

Further dyestuffs which colour cellulose acetate spinning compositions the tints listed in Column III of the following table may be obtained by the method described in Example 9 from the anthraquinone derivatives listed in Column I and the disulphamides in Column II; the dyestuffs are soluble in soluble in acetone

| I | II | III |
|---|---|---|
| 1-amino-4-bromoanthraquinone (O, NH$_2$; O, Br) | benzene with -SO$_2$-NH-(CH$_2$)$_3$-O-CH(CH$_3$)-CH$_3$ and -SO$_2$NH$_2$ | Bluish red. |
| 1-methylamino-4-bromoanthraquinone (O, NHCH$_3$; O, Br) | O$_2$S(NH$_2$)-C$_6$H$_4$-SO$_2$NH(CH$_2$)$_3$OCH(CH$_3$)$_2$ | Violet. |
| 1-amino-2,4-dibromoanthraquinone (O, NH$_2$, Br; O, Br) | O$_2$S(NH$_2$)-C$_6$H$_4$-SO$_2$NH(CH$_2$)$_3$CH$_3$ | Bluish red. |
| 1-amino-2,4-dibromoanthraquinone (O, NH$_2$, Br; O, Br) | O$_2$S(NH$_2$)-C$_6$H$_4$-SO$_2$NH(CH$_2$)$_3$OCH(CH$_3$)$_2$ | Do. |
| 1-amino-2-bromo-4-bromoanthraquinone | O$_2$S(NH$_2$)-C$_6$H$_3$(OCH$_3$)-SO$_2$NH(CH$_2$)$_3$OCH(CH$_3$)$_2$ | Do. |
| 1,8-diamino-4-bromoanthraquinone (O, NH$_2$; O, Br; NH$_2$) | O$_2$S(NH$_2$)-C$_6$H$_3$(Cl)-SO$_2$NH(CH$_2$)$_3$OCH(CH$_3$)$_2$ | Do. |
| 1-amino-4-bromoanthraquinone | O$_2$S(NH$_2$)-C$_6$H$_3$(OCH$_3$)-SO$_2$NH(CH$_2$)$_3$OCH(CH$_3$)$_2$ | Do. |
| 1-methylamino-4-bromoanthraquinone (O, NH-CH$_3$; O, Br) | O$_2$S(NH$_2$)-C$_6$H$_3$(CH$_3$)-SO$_2$NH(CH$_2$)$_3$OCH(CH$_3$)$_2$ | Reddish violet. |

EXAMPLE 10

26 parts of 1-amino-4-chloroanthraquinone, 48 parts of benzenesulphonic acid-N-(γ-isopropoxypropyl)-amide-3-sulphonic acid amide, 16 parts of anhydrous potassium acetate and 4 parts of anhydrous copper acetate are suspended in 500 parts of amyl alcohol, and the whole is stirred for 12 hours under reflux. The solvent is then removed from the bluish red solution by steam distillation. The dried residue is a dark red powder which dissolves in acetone to give a bluish red solution and colours a cellulose acetate spinning composition a fast, bluish red tint.

Colouration procedure 1 part of the dyestuff is dissolved in 100 parts of acetone. The solution so obtained is added to a solution of 60 parts of commercially available cellulose acetate in 300 parts of acetone. The coloured solution so prepared is spun, for example, into a filament consisting of 5 single filaments of approximately 4 denier each in a current of hot air in a spinning device.

What is claimed is:

1. A dyestuff of the formula, substituted in the alpha position of the anthraquinone moiety:

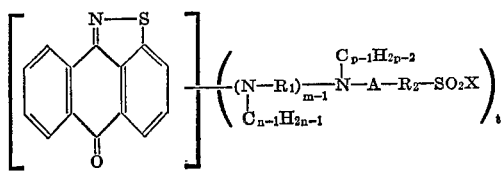

wherein $n$ and $p$ each represents a positive integer not greater than 7, $m$ represents a positive integer not greater than 2, $t$ represents an integer from 1 to 2, $R_1$ and $R_2$ are each selected from the group consisting of a benzene nucleus which may be optionally substituted by a substituent selected from the group of lower alkyl, lower alkoxy and halo; A is selected from the group consisting of —CO— and —SO$_2$— and X is selected from the group consisting of an alkylamine containing from 4 to 10 carbon atoms, a cyclohexylamine and an alkoxyalkylamine containing from 4 to 10 carbon atoms, which are bound to the —SO$_2$— bridging group through its nitrogen atom.

2. An anthraquinone dyestuff according to claim 1, which corresponds to the formula

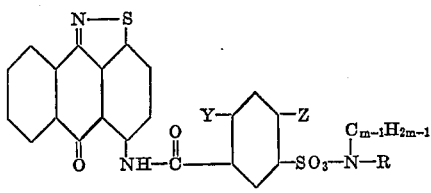

in which Y represents a member selected from the group consisting of a chlorine and a hydrogen atom, Z represents a member selected from the group consisting of a lower alkoxy group and a hydrogen atom, $m$ represents a positive integer not greater than 7 and R represents a member selected from the group consisting of a cycloalkyl, lower alkyl or alkoxyalkyl residue containing 4 to 10 carbon atoms.

3. The dyestuff according to claim 2 which corresponds to the formula

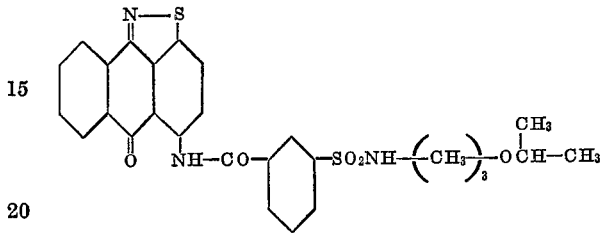

References Cited

UNITED STATES PATENTS 2,893,994   7/1959   Helfaer et al. _____ 260—303

ALEX MAZEL, Primary Examiner

R. J. GALLAGHER, Assistant Examiner

U.S. Cl. X.R.

8—40; 260—372, 373, 374, 378, 380, 381, 544

UNITED STATES PATENT OFFICE
CERTIFICATE OF CORRECTION

Patent No. 3,522,264　　　　Dated July 28, 1970

Inventor(s) CHRISTIAN ZICKENDRAHT ET AL

It is certified that error appears in the above-identified patent and that said Letters Patent are hereby corrected as shown below:

Column 15, in the formula of claim 2

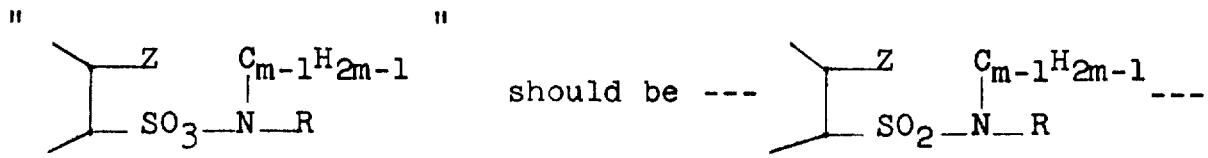

Signed and sealed this 11th day of May 1971.

(SEAL)
Attest:

EDWARD M. FLETCHER, JR.　　　　WILLIAM E. SCHUYLER, JR.
Attesting Officer　　　　　　　　Commissioner of Patents